United States Patent
Gdovic

(10) Patent No.: US 10,704,532 B2
(45) Date of Patent: Jul. 7, 2020

(54) SAVONIUS WIND TURBINES

(71) Applicant: Ronald Gdovic, Harrison City, PA (US)

(72) Inventor: Ronald Gdovic, Harrison City, PA (US)

( * ) Notice: Subject to any disclaimer, the term of this patent is extended or adjusted under 35 U.S.C. 154(b) by 416 days.

(21) Appl. No.: 15/485,822

(22) Filed: Apr. 12, 2017

(65) Prior Publication Data

US 2017/0298902 A1 Oct. 19, 2017

Related U.S. Application Data

(60) Provisional application No. 62/322,278, filed on Apr. 14, 2016.

(51) Int. Cl.
| | |
|---|---|
| *F03D 3/06* | (2006.01) |
| *F03D 3/02* | (2006.01) |
| *F03D 3/00* | (2006.01) |
| *F03D 80/70* | (2016.01) |

(52) U.S. Cl.
CPC ............ *F03D 3/062* (2013.01); *F03D 3/005* (2013.01); *F03D 3/02* (2013.01); *F03D 80/70* (2016.05); *F05B 2240/213* (2013.01); *F05B 2240/50* (2013.01); *F05B 2240/62* (2013.01); *Y02E 10/74* (2013.01)

(58) Field of Classification Search
CPC . F03D 5/005; F03D 5/02; F03D 3/007; F03D 80/70; F05B 2240/213; F05B 2240/62; F05B 2250/191; Y02E 10/74
See application file for complete search history.

(56) References Cited

U.S. PATENT DOCUMENTS

| | | | | |
|---|---|---|---|---|
| 1,697,574 A | * | 1/1929 | Savonius | F03D 3/007 416/110 |
| 1,764,052 A | | 6/1930 | Pfeifer | |
| 1,824,336 A | * | 9/1931 | Francis | F03D 3/065 416/53 |

(Continued)

FOREIGN PATENT DOCUMENTS

| | | | |
|---|---|---|---|
| CN | 108561271 A | * 9/2018 | |
| DE | 102008044807 A1 | * 3/2010 | F03D 3/061 |

(Continued)

OTHER PUBLICATIONS

Fotiis, "Building a Savonius Wind Turbine—Animation" Jun. 23, 2012, accessed from https://www.youtube.com/watch?v=5ZM7njSC8xE on Jul. 19, 2019. (Year: 2012).*

(Continued)

*Primary Examiner* — Michael Lebentritt
*Assistant Examiner* — Topaz L. Elliott
(74) *Attorney, Agent, or Firm* — The Webb Law Firm

(57) ABSTRACT

A Savonius wind turbine includes a rotor assembly that rotates about a longitudinal axis. The rotor assembly includes at least two curved turbine blades extending parallel to the longitudinal axis and at least two support discs connected to the at least two curved turbine blades. At least one of the at least two support discs has at least one relief vent defined therein for allowing air to pass through the at least one support disc. The wind turbine may be provided with two rotor assemblies having their curved turbine blades arranged so that the rotor assemblies are driven to rotate in opposing rotational directions.

12 Claims, 14 Drawing Sheets

(56) References Cited

U.S. PATENT DOCUMENTS

| | | | |
|---|---|---|---|
| 2,007,963 A | | 7/1935 | Cleveland |
| 2,252,523 A | | 8/1941 | Plotkin |
| 2,431,111 A | | 11/1947 | Du Brie |
| 2,436,747 A | | 2/1948 | Du Brie |
| 4,047,833 A | | 9/1977 | Decker |
| 4,156,580 A | * | 5/1979 | Pohl ................ F03D 3/02 415/4.2 |
| 4,239,977 A | * | 12/1980 | Strutman ........... F03D 7/0224 290/44 |
| 4,382,191 A | * | 5/1983 | Potter ................ F03D 3/02 290/55 |
| 4,455,491 A | | 6/1984 | Lanzrath |
| 4,830,570 A | | 5/1989 | Benesh |
| 4,926,061 A | * | 5/1990 | Arreola, Jr. ........ F03D 3/02 290/55 |
| 5,038,049 A | | 8/1991 | Kato |
| 5,336,933 A | | 8/1994 | Emster |
| 5,454,694 A | | 10/1995 | O'Dell |
| 6,172,429 B1 | * | 1/2001 | Russell ............. F03D 9/008 290/54 |
| 6,191,496 B1 | | 2/2001 | Elder |
| 6,538,340 B2 | | 3/2003 | Elder |
| 6,767,025 B2 | | 7/2004 | Hagen |
| 6,910,873 B2 | | 6/2005 | Kaliski |
| 6,966,747 B2 | | 11/2005 | Taylor et al. |
| 6,984,899 B1 | | 1/2006 | Rice |
| 7,242,108 B1 | | 7/2007 | Dablo |
| 7,381,030 B1 | | 6/2008 | Vanderhye |
| 7,762,777 B2 | | 7/2010 | Vanderhye et al. |
| 7,896,608 B2 | | 3/2011 | Whitworth et al. |
| 8,075,196 B2 | | 12/2011 | Burner et al. |
| 8,174,135 B1 | | 5/2012 | Roe et al. |
| 8,198,747 B2 | * | 6/2012 | Kato ................ F03D 3/02 290/55 |
| 8,322,992 B2 | | 12/2012 | Fuller |
| 8,358,030 B2 | * | 1/2013 | Plaskove ............ F03D 3/02 290/55 |
| 8,672,633 B2 | * | 3/2014 | Ball ................ F03D 3/061 415/907 |
| 8,786,123 B2 | * | 7/2014 | Bannister ........... F03D 3/002 290/55 |
| 9,051,918 B1 | | 6/2015 | Hench et al. |
| 2007/0029807 A1 | * | 2/2007 | Kass ................ F03D 3/065 290/55 |
| 2007/0251090 A1 | | 11/2007 | Breugel et al. |
| 2009/0191057 A1 | | 7/2009 | Knutson |
| 2010/0092296 A1 | | 4/2010 | Ferenczy |
| 2010/0219643 A1 | | 9/2010 | Biucchi et al. |
| 2010/0296913 A1 | | 11/2010 | Lee |
| 2011/0037271 A1 | * | 2/2011 | Sheinman ........... F03D 3/02 290/55 |
| 2011/0070068 A1 | * | 3/2011 | Cumings ........... F03D 3/0481 415/30 |
| 2011/0135907 A1 | | 6/2011 | Shooshtari et al. |
| 2011/0250069 A1 | * | 10/2011 | Quintal ............. F03D 3/002 416/111 |
| 2012/0119504 A1 | | 5/2012 | Vigaev |
| 2012/0148403 A1 | | 6/2012 | Flaherty et al. |
| 2012/0235418 A1 | * | 9/2012 | Plaskove ............ F03D 3/02 290/55 |
| 2013/0287570 A1 | | 10/2013 | Gdovic |
| 2014/0367972 A1 | | 12/2014 | Rhee |
| 2015/0204313 A1 | * | 7/2015 | Bergua .............. F03D 80/88 416/145 |
| 2016/0377062 A1 | * | 12/2016 | Vallejo ............. F03D 15/00 416/170 R |

FOREIGN PATENT DOCUMENTS

| | | | | |
|---|---|---|---|---|
| DE | 102010045801 A1 | * | 3/2012 | ............. F03D 3/02 |
| DE | 102012017861 A1 | * | 3/2013 | ............. B29C 44/56 |
| JP | 2016017448 A | * | 2/2016 | |
| KR | 101157389 B1 | | 6/2012 | |
| WO | 3103683 A1 | | 12/1981 | |
| WO | 2004063565 A1 | | 7/2004 | |
| WO | 2010003955 A2 | | 1/2010 | |
| WO | WO-2010116983 A1 | * | 10/2010 | ............. F03D 3/061 |

OTHER PUBLICATIONS

NTN, Ball and Roller Bearings file:///C:/Users/telliott/Documents/References%20-%20Other/BearingSelection.pdf (Year: 2015).*

Johnson, G. Wind Energy Systems Chapter 4: Wind Turbine Energy, and Torque, 2001, https://www.rpc.com.au/pdf/wind4.pdf (Year: 2001).*

International Searching Authority, United States Patent and Trademark Office; International Search Report and Written Opinion re Patent Cooperation Treaty Application No. PCT/2017/027341; dated Aug. 16, 2017; 15 pgs.; Alexandria, Virginia, U.S.A.

* cited by examiner

SAVONIUS WIND TURBINES

CROSS REFERENCE TO RELATED APPLICATION

The present application claims priority from U.S. Provisional Patent Application No. 62/322,278, filed on Apr. 14, 2016, which is hereby incorporated by reference in its entirety.

BACKGROUND OF THE INVENTION

Field of the Invention

The present invention relates to a wind turbine, and, in particular, a self-starting Savonius wind turbine incorporating structures to assist in handling high winds and structural stress.

Description of Related Art

Windmills that harness wind energy using a plurality of exposed blades have been used both privately and commercially for some time. Such windmills often have a very high initial cost due to the cost of materials used, the cost required to transport the windmill, and time required to install components of the windmill. For example, windmills typically can be very heavy having a steel tower weighing over 2,500 pounds. Such large and heavy structures can be difficult to transport to an installation site. These large, heavy structures often require complex installation and require regular maintenance to ensure they operate at optimum performance. Additionally, once the windmill is erected, it is not intended to be moved to another location. Furthermore, traditional windmills are usually ineffective in variable wind conditions, such as wind coming from more than one direction during operation.

SUMMARY OF THE INVENTION

According to one example of the present disclosure, a rotor assembly for a wind turbine is provided. The rotor assembly is configured to rotate about a longitudinal axis. The rotor assembly comprises at least one rotor section, the at least one rotor section comprising: at least two curved turbine blades extending parallel to the longitudinal axis; and at least two support discs connected to the at least two curved turbine blades. At least one of the at least two support discs has at least one relief vent defined therein for allowing air to pass through the at least one support disc.

According to another example of the present disclosure, a wind turbine is provided. The wind turbine comprises two rotor assemblies configured to rotate about a longitudinal axis, each rotor assembly comprising at least one rotor section that comprises at least two curved turbine blades extending parallel to the longitudinal axis. The curved turbine blades of the two rotor assemblies are oriented with respect to the longitudinal axis so that the two rotor assemblies are driven to rotate about the longitudinal axis in opposing rotational directions by wind.

According to another example of the present disclosure, a wind turbine is provided. The wind turbine comprises a frame structure; at least one rotor assembly provided on the frame structure and configured to rotate about a longitudinal axis, the at least one rotor assembly comprising at least one rotor section that comprises at least two curved turbine blades extending parallel to the longitudinal axis; and a torsion rod extending through the at least one rotor assembly along the longitudinal axis, the torsion rod being connected to the at least one rotor assembly so that rotation of the at least one rotor assembly causes rotation of the torsion rod. The torsion rod is configured to be connected to a transmission disposed on the frame structure. The torsion rod is also configured to twist to absorb lateral stresses on the at least one rotor assembly. The at least one rotor assembly is mounted on a support post and a bearing on the frame structure independent of the torsion rod.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
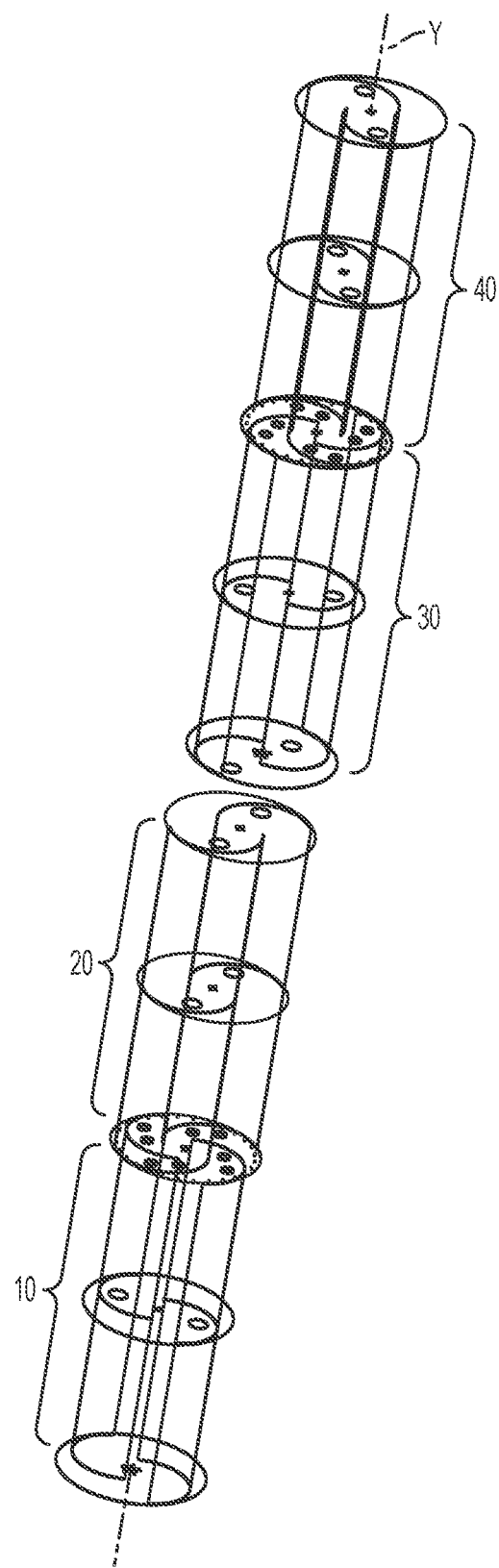
FIG. 1 is a perspective view of a pair of rotor assemblies of a Savonius wind turbine in accordance with an example of the present disclosure.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the examples disclosed herein are not to be considered as limiting.

With reference to FIGS. 1-5B, a pair of rotor assemblies for a Savonius wind turbine, such as the Savonius wind turbine described in Applicant's U.S. Patent Application Publication No. 2013/0287570, is shown in accordance with an example of the present disclosure. The rotor assemblies are configured to be assembled and supported within a frame 100 (shown in FIGS. 6 and 12) so as to rotate about a longitudinal axis Y when acted upon by wind energy and to be operatively connected to a transmission (not shown) disposed in a transmission box 101 (shown in FIGS. 6, 7, 9, and 13) in order to transfer wind energy to the transmission and electric motor to generate electricity, as discussed in detail in U.S. Patent Application Publication No. 2013/0287570, which is hereby incorporated by reference in its entirety.

As shown, the lower rotor assembly includes a first rotor section 10 and a second rotor section 20. The upper rotor assembly includes a third rotor section 30 and a fourth rotor section 40. Each of the rotor sections 10, 20, 30, 40 are of similar construction and length. The rotor assemblies shown in FIG. 1 are configured for installation in a 40' Savonius wind turbine having a combined 32' rotor assembly made up of the first, second, third, and fourth rotor sections 10, 20, 30, 40, each of which is 8' long. It is to be appreciated that a rotor assembly for a smaller Savonius wind turbine will include fewer rotor sections. For instance, a 20' Savonius wind turbine may only include the first rotor section 10 and the second rotor section 20 shown in FIG. 1, thus forming a 16' rotor assembly, assembled on a suitably sized frame. Also, as shown in FIGS. 1-5B, the turbine blades 11, 12 of the first rotor section 10 are offset 90° from the turbine blades 21, 22 of the second rotor section 20 so that the first and second rotor sections 10, 20 may collectively capture wind from any direction. Similarly, the turbine blades 31, 32 of the third rotor section 30 are offset 90° from the turbine blades 41, 42 of the fourth rotor section 40 for the same reason. The configuration, shape, and construction of the turbine blades 11, 12, 21, 22, 31, 32, 41, 42 discussed herein are described in greater detail in U.S. Patent Application Publication No. 2013/0287570 and below with reference to FIG. 14.

Figure 2A:
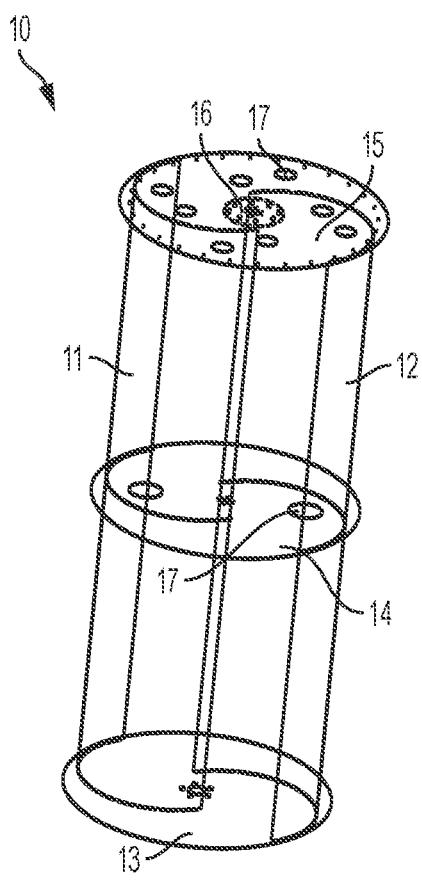
FIGS. 2A and 2B are perspective and side views of a first rotor section of a lower rotor assembly of FIG. 1.
Figure 2B:
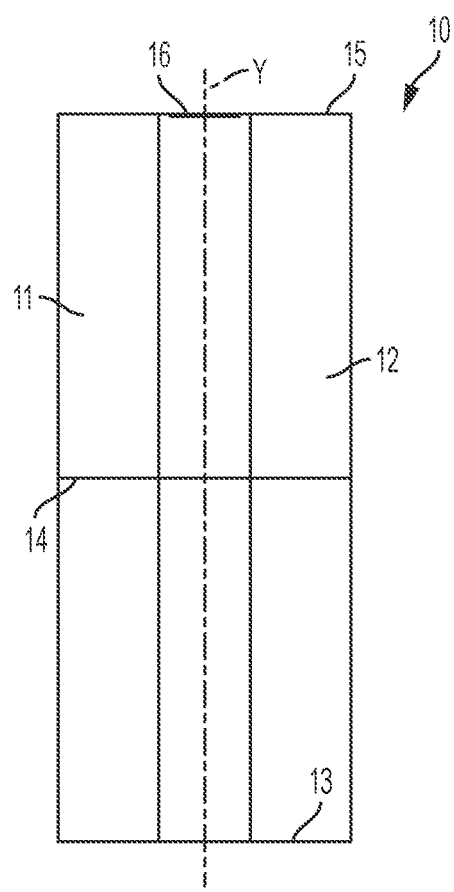

As shown in FIGS. 2A and 2B, the first rotor section 10 includes the two offset turbine blades 11, 12 extending parallel to the longitudinal axis Y along the longitudinal length of the rotor section 10. It is to be appreciated that the turbine blades 11, 12 of the first rotor section 10, as well as the turbine blades 21, 22, 31, 32, 41, 42 of the other rotor sections 20, 30, 40 may be sized, shaped and configured with respect to each other in a manner that optimizes the transmission energy from wind to the blades 11, 12 and on to the transmission, as will be discussed below. The first rotor section 10 also includes a lower support disc 13 connected to the bottoms of the turbine blades 11, 12, a middle support disc 14 connected to the turbine blades 11, 12 at their approximate middle lengths, and an upper support disc 15 connected to the tops of the turbine blades 11, 12. According to an example of the present disclosure, the lower support disc 13, middle support disc 14, and upper support disc 15 are connected to the turbine blades 11, 12 by welding. It is to be appreciated, though, that the turbine blades 11, 12 may be connected to the support discs 13, 14, 15 in any manner known suitable to those having ordinary skill in the art. A reinforcement plate 16 is connected to the upper support disc 15 in order to structurally reinforce the engagement between the upper support disc 15 and a torsion rod 106 (shown in FIGS. 8 and 10-13) extending through the rotor section 10, as will be discussed in greater detail below, and between the upper support disc 15 and a lower support disc 23 of the second rotor section 20 positioned above the first rotor section 10.

The support discs 13, 14, 15 provide structural support to the first rotor section 10. The middle and upper support discs 14, 15 incorporate strategically sized and placed relief vents 17 or passageways therein to allow air at high pressures to escape from between the rotor blades 11, 12 during high winds. The rotor assemblies function by directing incoming air into offset convex rotor blades 11, 12, 21, 22, 31, 32, 41, 42 causing rotation of the rotor sections 10, 20, 30, 40 around the longitudinal axis Y. Non-laminar wind flow, turbulence, high winds, and particularly, wind gusts transfer a significant amount of lateral load on the rotor sections 10, 20, 30, 40 beyond normal operations. As wind load on the blades 11, 12, 21, 22, 31, 32, 41, 42 exceeds the limitations of the blade material, the connections between the blades 11, 12, 21, 22, 31, 32, 41, 42 and other elements of the rotor sections 10, 20, 30, 40 will undergo structural failure, causing failure of the entire rotor assembly.

Remedying this problem with heavier material or more structural supports adds weight, cost, and complexity to a rotor that should be as lightweight, balanced, and inexpensive as possible to be feasible for economical operations. Completely open rotors without upper and lower supports, such as the support discs 13, 14, 15, is not a practical solution because the discs 13, 14, 15 serve important functions, including functioning as flywheels. Angular momentum of the discs 13, 14, 15 stores a great deal of kinetic energy and helps smooth rotation and the resulting flow of energy to the transmission.

The relief vents 17 or passageways in the support discs 14, 15 are strategically placed in the support disc structures to reduce high pressure within the rotor section 10 caused by high wind gusts (i.e., a wind gust having an increase in wind velocity of 20 mph or greater over the steady wind velocity in a short duration of several seconds). These vents 17 are designed to exhaust only excess wind energy entering the rotor section 10 that threatens to exceed the structural loads able to be withstood by the rotor assembly, thereby compromising the structural integrity of the rotor section 10, while allowing rotation (tip speed ratio) of the rotor assembly to normalize to limit torque within an operating range of the rotor assembly. The relief vents 17 are configured to have zero to minimal impact on the transmission of wind energy to the blades 11, 12 under normal wind conditions. As will be discussed, similar relief vents are also provided in the support discs of the second, third, and fourth rotor sections 20, 30, 40.

Figure 3A:
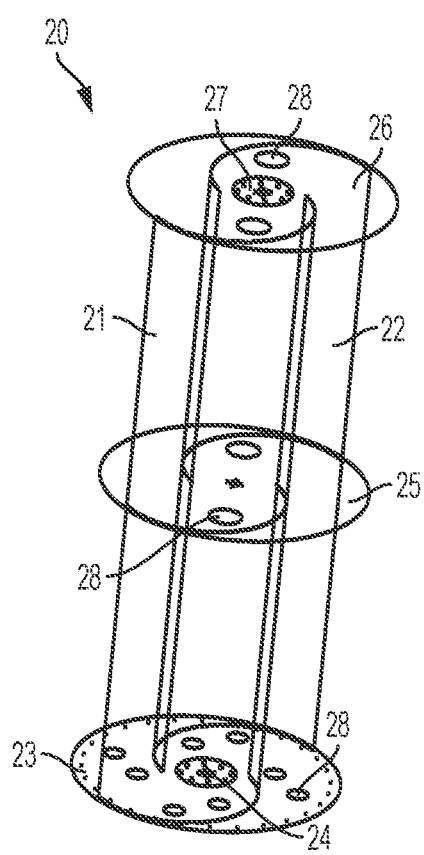
FIGS. 3A and 3B are perspective and side views of a second rotor section of a lower rotor assembly of FIG. 1.
Figure 3B:
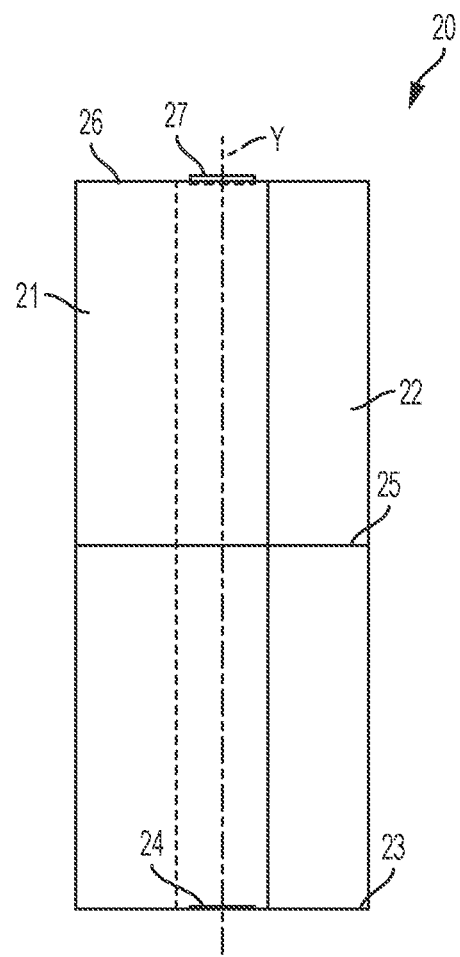

With reference to FIGS. 3A and 3B, the second rotor section 20 is disposed above the first rotor section 10 and includes the two offset turbine blades 21, 22 extending parallel to the longitudinal axis Y along the longitudinal length of the rotor section 20. As discussed above, the turbine blades 21, 22 are offset 90° from the blades 11, 12 in the first rotor section 10. The second rotor section 20 also includes a lower support disc 23 connected to the bottoms of the turbine blades 21, 22, a middle support disc 25 connected to the turbine blades 21, 22 at their approximate middle lengths, and an upper support disc 26 connected to the tops of the turbine blades 21, 22. The support discs 23, 25, 26 may be connected to the turbine blades 21, 22 by welding or any other suitable method. A reinforcement plate 24 is connected to the lower support disc 23 in order to structurally reinforce the engagement between the lower support disc 23 and the torsion rod 106 (shown in FIGS. 8 and 10-13) and between the lower support disc 23 and the upper support disc 15 of the first rotor section 10. The first and second rotor sections 10, 20 are connected using fasteners provided in and extending between the reinforcement plate 16 on the upper support disc 15 of the first rotor section 10 and the reinforcement plate 24 on the lower support disc 23 of the second rotor section 20. Similarly, a reinforcement plate 27 is connected to the top surface of the upper support disc 26 to reinforce the top of the second rotor section 20.

As discussed above with respect to the first rotor section 10, the support discs 23, 25, 26 of the second rotor section 20 each have a plurality of relief vents 28 or passageways defined therein that are strategically sized and located to allow high pressure air to be vented from the second rotor section 20 and reduce stress on the second rotor section 20 due to high winds and turbulence. As shown in FIG. 1, the relief vents 28 in the lower support disc 23 may be similarly configured to and aligned with the relief vents 17 in the upper support disc 15 of the first rotor section 10 to allow air to vent between the first and second rotor sections 10, 20.

Figure 4A:
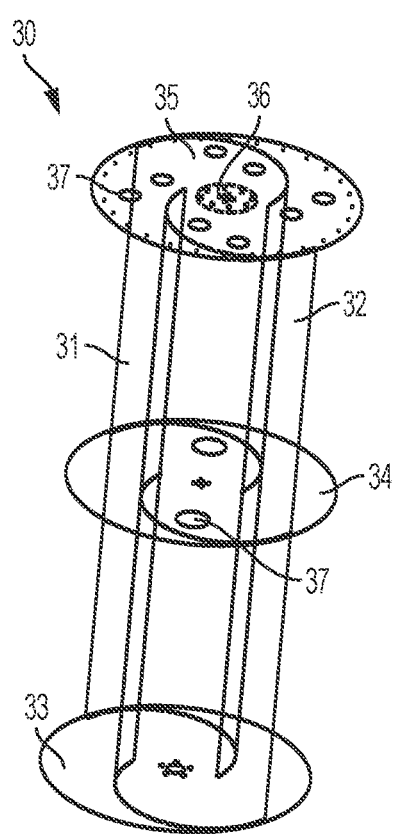
FIGS. 4A and 4B are perspective and side views of a third rotor section of an upper rotor assembly of FIG. 1.
Figure 4B:
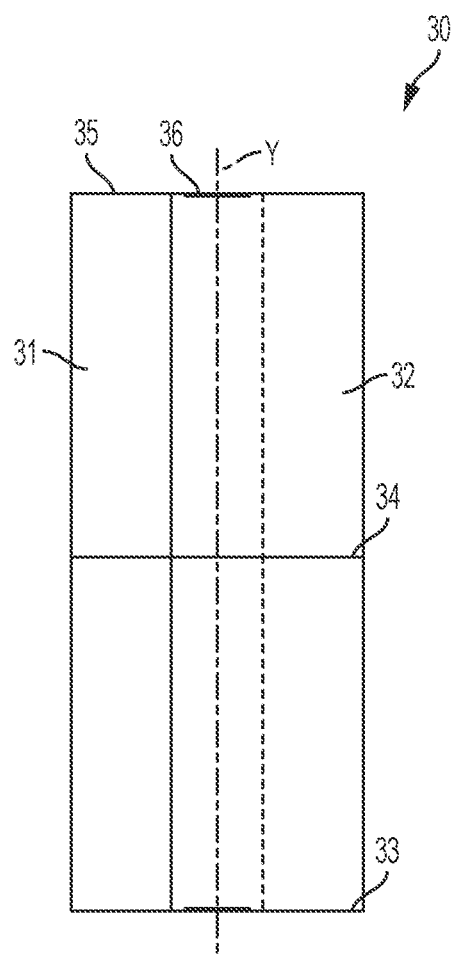

With reference to FIGS. 4A and 4B, the third rotor section 30 includes the two offset turbine blades 31, 32 extending parallel to the longitudinal axis Y along the longitudinal length of the third rotor section 30. The third rotor section 30 also includes a lower support disc 33 connected to the bottoms of the turbine blades 31, 32, a middle support disc 34 connected to the turbine blades 31, 32 at their approximate middle lengths, and an upper support disc 35 connected to the tops of the turbine blades 31, 32. The support discs 33, 34, 35 may be connected to the turbine blades 31, 32 by welding or any other suitable method. A reinforcement plate 36 is connected to the upper support disc 35 in order to structurally reinforce the engagement between the upper support disc 35 and the torsion rod 106 (shown in FIGS. 8 and 10-13) extending through the third rotor section 30, and between the upper support disc 35 and a lower support disc 43 of the fourth rotor section 40 positioned above the third rotor section 30.

As discussed above with respect to the first rotor section 10, the middle and upper support discs 34, 35 of the third rotor section 30 each have a plurality of relief vents 37 or passageways defined therein that are strategically sized and located to allow high pressure air to be vented from the third rotor section 30 and reduce stress on the third rotor section 30 due to high winds and turbulence.

Figure 5A:
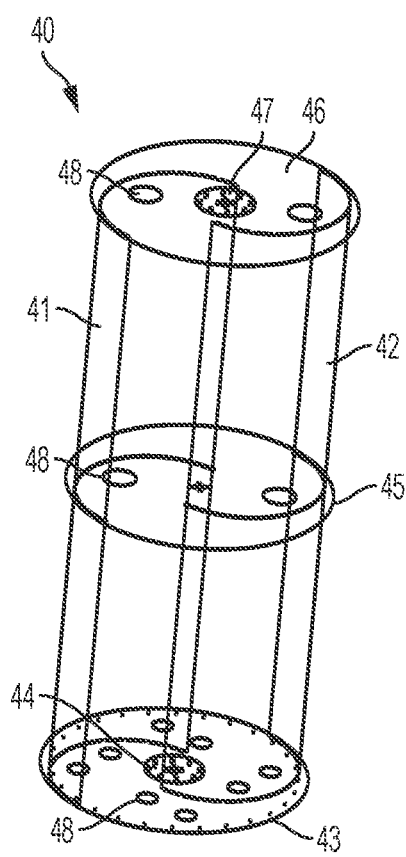
FIGS. 5A and 5B are perspective and side views of a fourth rotor section of an upper rotor assembly of FIG. 1.
Figure 5B:
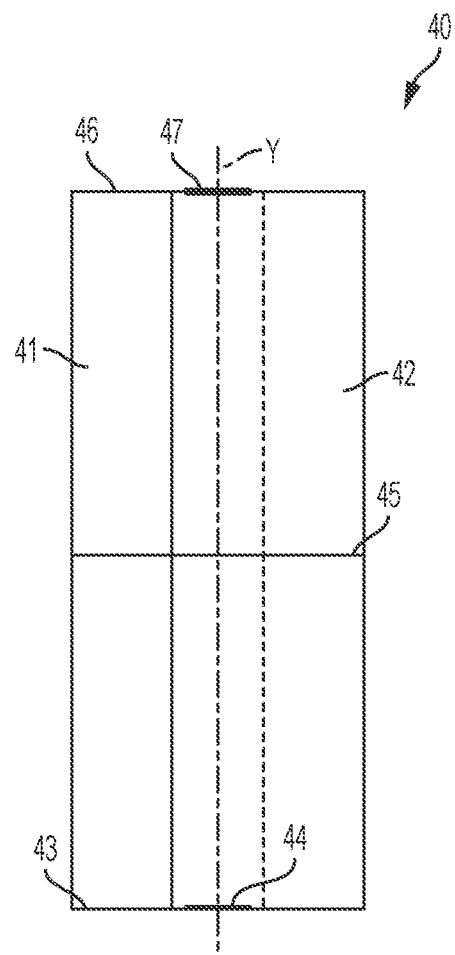

With reference to FIGS. 5A and 5B, the fourth rotor section 40 includes the two offset turbine blades 41, 42 extending parallel to the longitudinal axis Y and along the longitudinal length of the fourth rotor section 40. As discussed above, the turbine blades 41, 42 are offset 90° from the blades 31, 32 in the third rotor section 30. The fourth rotor section 40 also includes a lower support disc 43 connected to the bottoms of the turbine blades 41, 42, a middle support disc 45 connected to the turbine blades 41, 42 at their approximate middle lengths, and an upper support disc 46 connected to the tops of the turbine blades 41, 42. The support discs 43, 45, 46 may be connected to the turbine blades 41, 42 by welding or any other suitable method. A reinforcement plate 44 is connected to the lower support disc 43 in order to structurally reinforce the engagement between the lower support disc 43 and the torsion rod 106 (shown in FIGS. 8 and 10-13) and between the lower support disc 43 and the upper support disc 35 of the third rotor section 30. The third and fourth rotor sections 30, 40 are connected using fasteners provided in and extending between the reinforcement plate 36 on the upper support disc 35 of the third rotor section 30 and the reinforcement plate 24 on the lower support disc 23 of the second rotor section 20. Similarly, a reinforcement plate 47 is connected to the top surface of the upper support disc 46 to reinforce the top of the fourth rotor section 40.

As discussed above with respect to the first rotor section 10, the support discs 43, 45, 46 of the fourth rotor section 40 each have a plurality of relief vents 48 or passageways defined therein that are strategically sized and located to allow high pressure air to be vented from the fourth rotor section 40 and reduce stress on the fourth rotor section 40 due to high winds and turbulence. As shown in FIG. 1, the relief vents 48 in the lower support disc 43 may be similarly configured to and aligned with the relief vents 37 in the upper support disc 35 of the third rotor section 30 to allow air to vent between the third and fourth rotor sections 30, 40.

With reference to FIGS. 1-5B, the Savonius rotor assemblies transfer wind energy into kinetic energy around longitudinal axis Y. Rotation of the rotor assemblies creates axial and lateral forces on the supporting structure of the Savonius wind turbine. The effect of wind loads on the rotor assemblies and wind turbine structure in general are variable with the variation in velocity, density, temperature, and turbulence of the wind. In addition to the known axial and lateral loads created by the wind itself, as the rotor assemblies rotate at high speeds, the physical profile of the rotor assemblies resemble a cylinder in terms of the aerodynamic effect of the wind on the structure of the rotor assemblies.

According to the Kutta-Joukoski Lift Theorem for a Cylinder, lift will be created perpendicular to the wind load direction. Under certain conditions of variable wind load and under rotation, large Savonius rotors will experience this lift as an additional lateral load (perpendicular to the wind) to the structure of the wind turbine.

As shown in FIG. 1, the curved turbine blades 11, 12, 21, 22 of the first and second rotor sections 10, 20 and the curved turbine blades 31, 32, 41, 42 of the third and fourth rotor sections 30, 40 are oriented with respect to the longitudinal axis Y such that the first and second rotor sections 10, 20 are arranged to rotate in an opposite rotational direction from the third and fourth rotor sections 30, 40. The stacking of the rotor sections 10, 20, 30, 40 of the rotor assemblies so that they rotate in opposite directions (counter-rotating) minimizes or eliminates the non-axial torque reaction between the stacked rotor sections 10, 20, 30, 40. In other words, the lateral "lift" load created by the wind moving across the rotor sections 10, 20 of the lower rotor assembly is balanced by the lateral "lift" load created by the wind moving across the rotor sections 30, 40 of the upper rotor assembly to minimize or eliminate the transfer of any lateral "lift" load from the rotor assemblies to the structure of the wind turbine.

As such, according to the example of the rotor assemblies shown in FIG. 1, the first and second rotor sections 10, 20 of the lower rotor assembly and the third and fourth rotor sections 30, 40 of the upper rotor assembly may be considered as forming two separate rotor assemblies assembled on a common frame structure. To that end, according to the example of FIG. 1, the lower first and second rotor sections 10, 20 may be connected to a separate torsion rod 106 (shown in FIGS. 8 and 10-13) and transmission box 101 (shown in FIGS. 6, 7, 9, and 13) to transfer wind energy to separate transmissions for generating electrical power. It is to be appreciated, however, that the Savonius wind turbine may be constructed with a single transmission separately connected to the counter-rotating rotor sections 10, 20, 30, 40. It is further to be appreciated that the arrangement of the counter-rotating rotor sections 10, 20, 30, 40 discussed above with respect to FIGS. 1-5B is applicable to the 40' Savonius wind turbine construction. For the 20' Savonius wind turbine section, the two rotor sections 10, 20 will rotate in a single direction.

Figure 6:
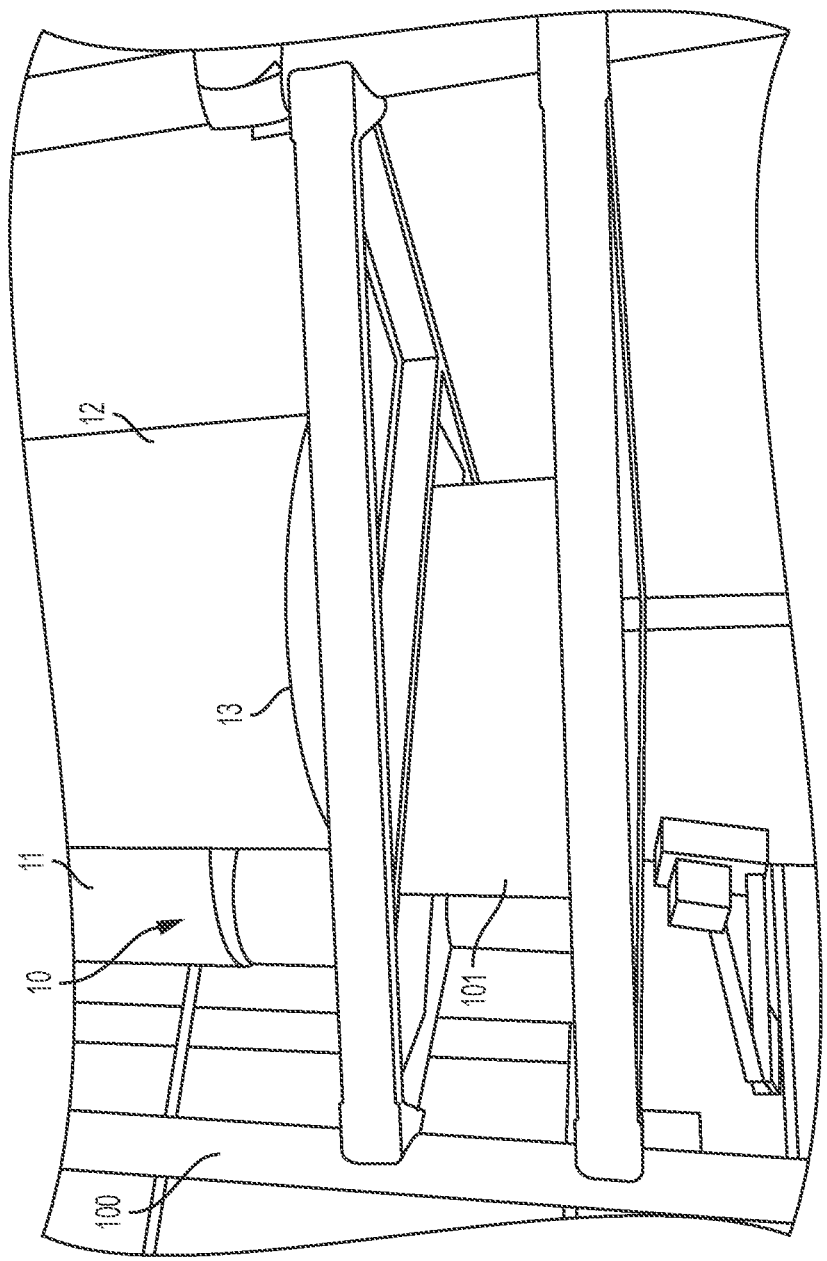
FIG. 6 is a perspective view of a lower portion of a Savonius wind turbine in accordance with an example of the present disclosure.
Figure 7:
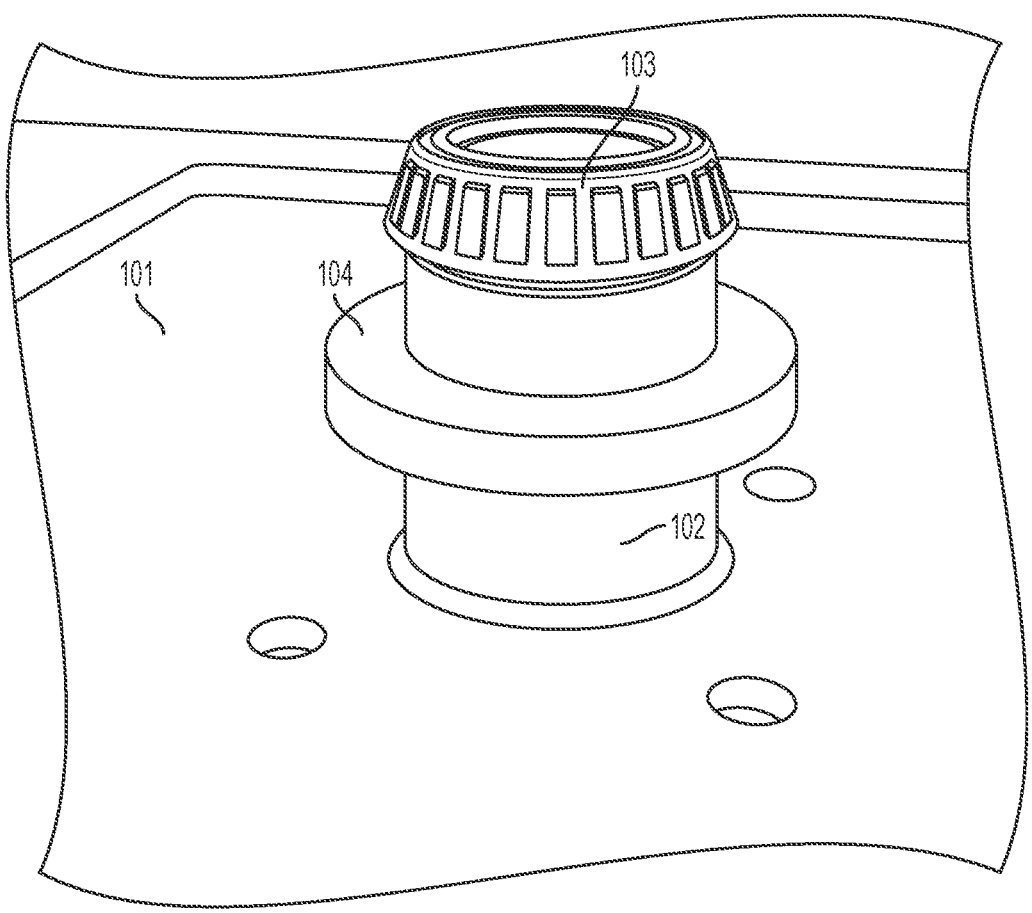
FIG. 7 is a perspective view of a bottom support post and bearing of the Savonius wind turbine of FIG. 6.

With reference to FIGS. 6-13, the support structure of the Savonius wind turbine to which the rotor assembly of FIGS. 1-5B is assembled will be discussed in more detail. As shown in FIG. 6, the Savonius wind turbine includes the frame 100 that extends from the bottom of the wind turbine assembly to the top, as discussed in more detail in Applicant's U.S. Patent Application Publication No. 2013/0287570. The transmission and electric motor for generating electrical power is disposed within a transmission box 101 mounted on the frame 100 beneath the first rotor section 10. It is to be appreciated that in those instances where the first and second lower rotor sections 10, 20 are counter-rotating from the third and fourth upper rotor sections 30, 40, as discussed above, the Savonius wind turbine is provided with two transmission boxes 101 mounted on the frame 100. The first transmission box 101 is located at the base of the frame 100 beneath the first rotor section 10 and the second is located midway along the frame 100 between the top of the second rotor section 20 and the bottom of the third rotor section 30. It is also to be appreciated that the transmission box 101 may be partly or wholly formed from structural components of the frame 100 in order to transfer axial and lateral loads from the rotor assembly to the frame 100.

Figure 8:
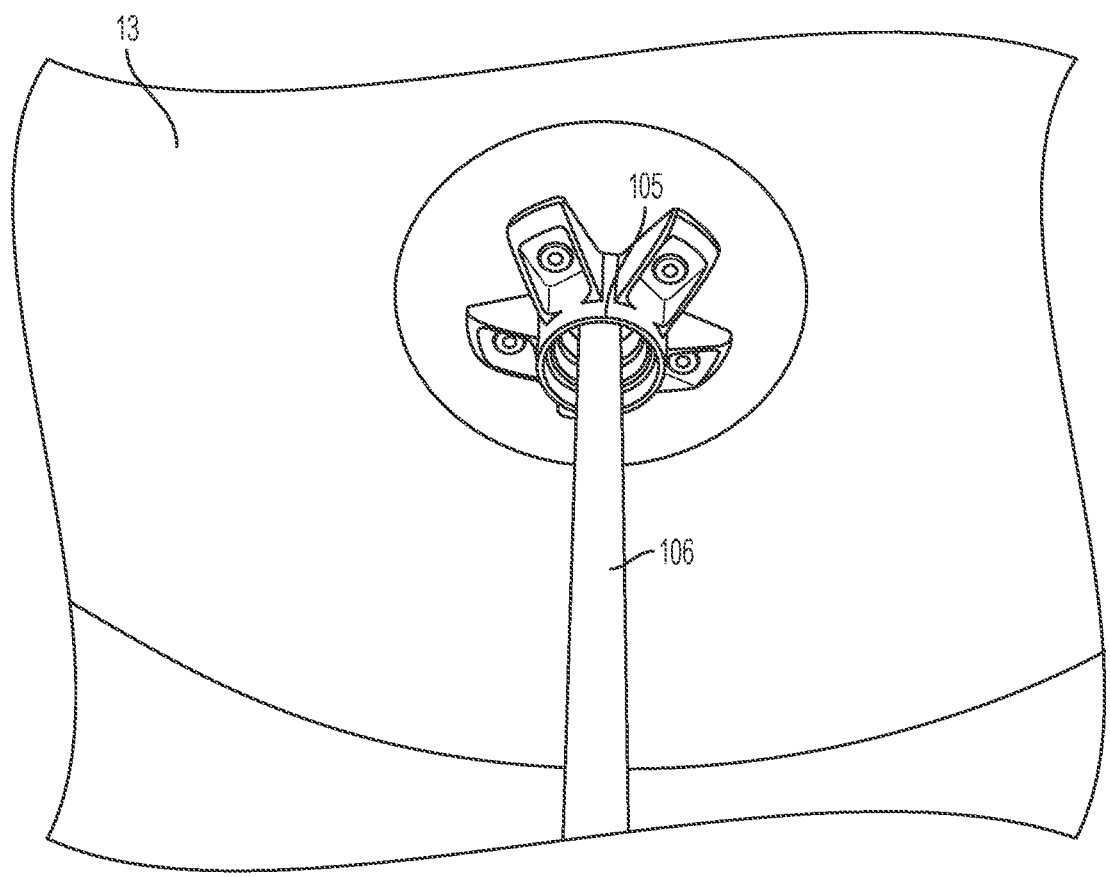
FIG. 8 is a perspective view of a bottom hub and torsion rod of the rotor assembly of the Savonius wind turbine of FIG. 6.

As shown in FIG. 8, the torsion rod 106 extends through the lower support disc 13 of the first rotor section 10 (or the lower support disc 33 of the third rotor section 30). A bottom hub 105 is fastened to the bottom surface of the lower support disc 13 in a position surrounding the torsion rod 106. The bottom hub 105 surrounds the torsion rod 106 and extends downwardly from the bottom support disc 13.

Figure 9:
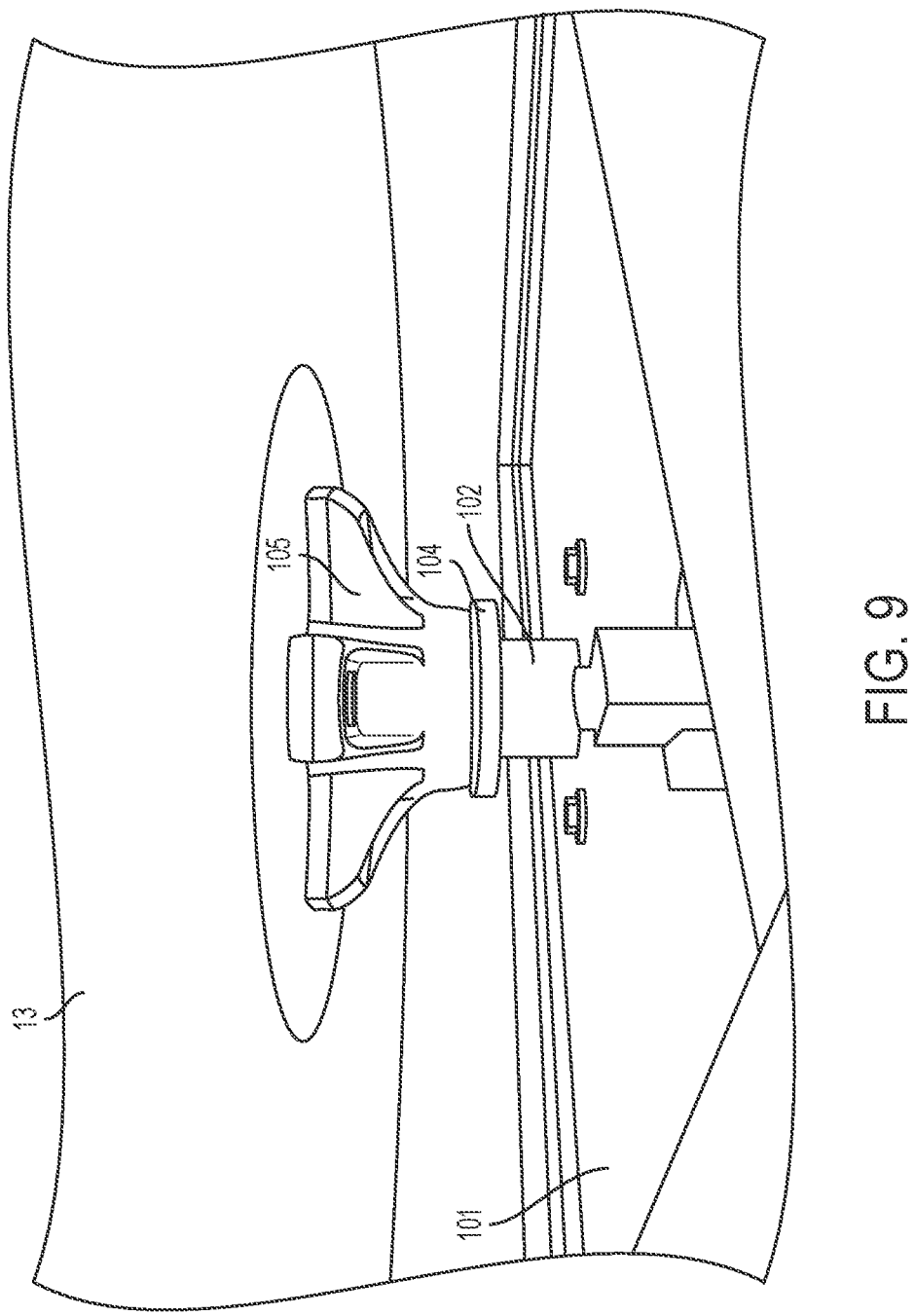
FIG. 9 is a perspective view of the engagement between the bottom of the rotor assembly and the support post and bearing in the Savonius wind turbine of FIG. 6.

As shown in FIG. 9, when the rotor assembly is assembled on the frame 100, the bottom hub 105 is disposed over and engages a bearing 103 on a support post 102 extending upwardly from the transmission box 101 with the bearing 103 fitting within a recess defined in the bottom hub 105. The torsion rod 106 extends through the engaged bottom hub 105, bearing 103, and support post 102 into the interior of the transmission box 101 to connect to the transmission. A gasket 104 is positioned directly beneath the bottom hub 105 to protect the engagement between the bottom hub 105 and the bearing 103 from environmental conditions. Accordingly, it is to be appreciated that the axial load of the rotor assembly is transferred onto the frame 100 via the bearing 103 and support post 102 and that the bearing 103 allows for free rotation of the rotor assembly and the torsion rod 106 with respect to the frame 100.

Figure 10:
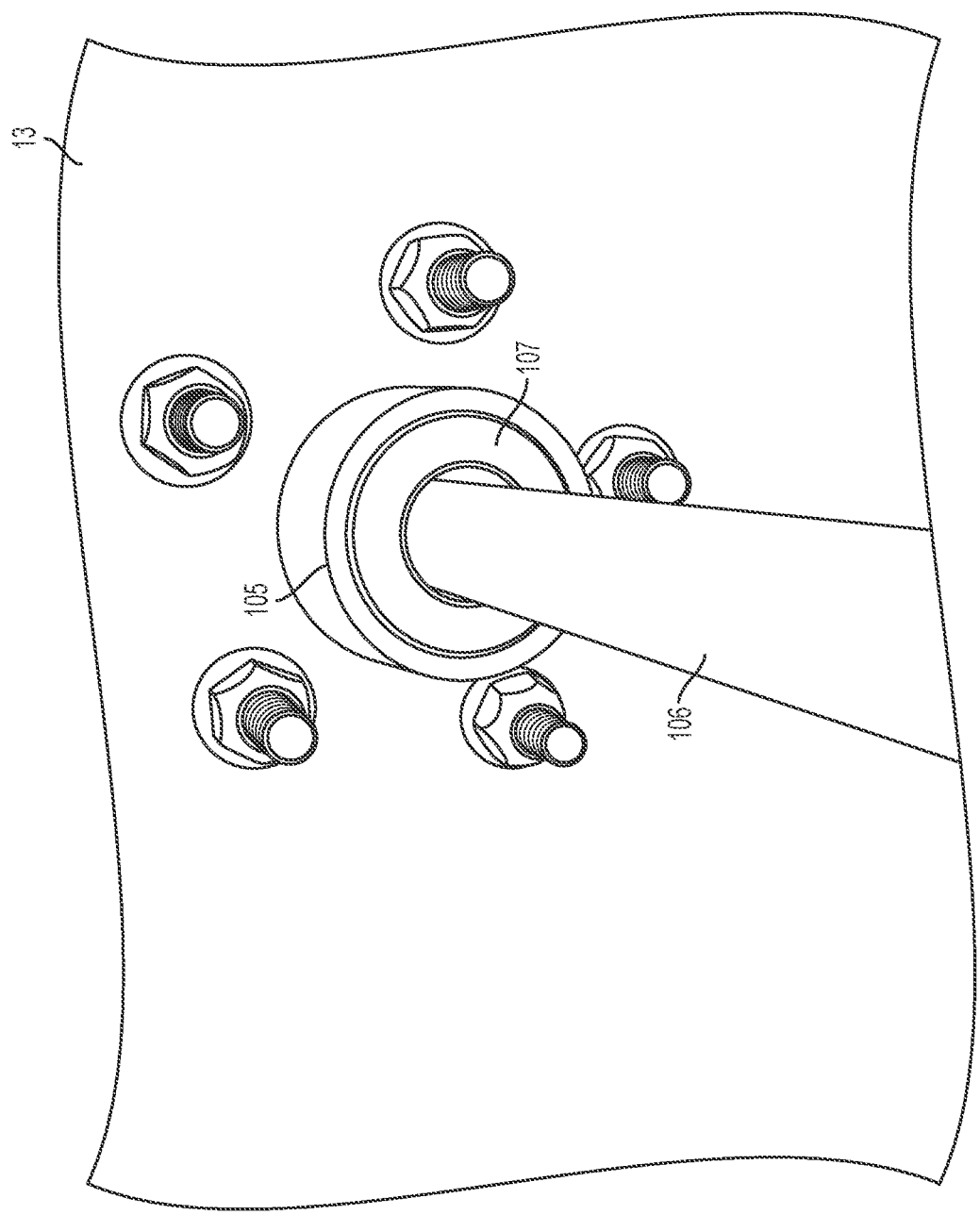
FIG. 10 is a perspective view of the bottom hub and torsion rod from the interior of the first rotor section of the Savonius wind turbine of FIG. 6.

With reference to FIG. 10, the bottom hub 105 is configured to extend through the lower support disc 13 of the first rotor section 10 (or the lower support disc 33 of the third rotor section 30) around the torsion rod 106 in order to stabilize the rotor assembly on the torsion rod 106. A gasket 107 is inserted in the bottom hub 105 surrounding the torsion rod 106 to protect the engagement of the bottom hub 105, the bearing 103, and the torsion rod 106 from environmental conditions.

Figure 11:
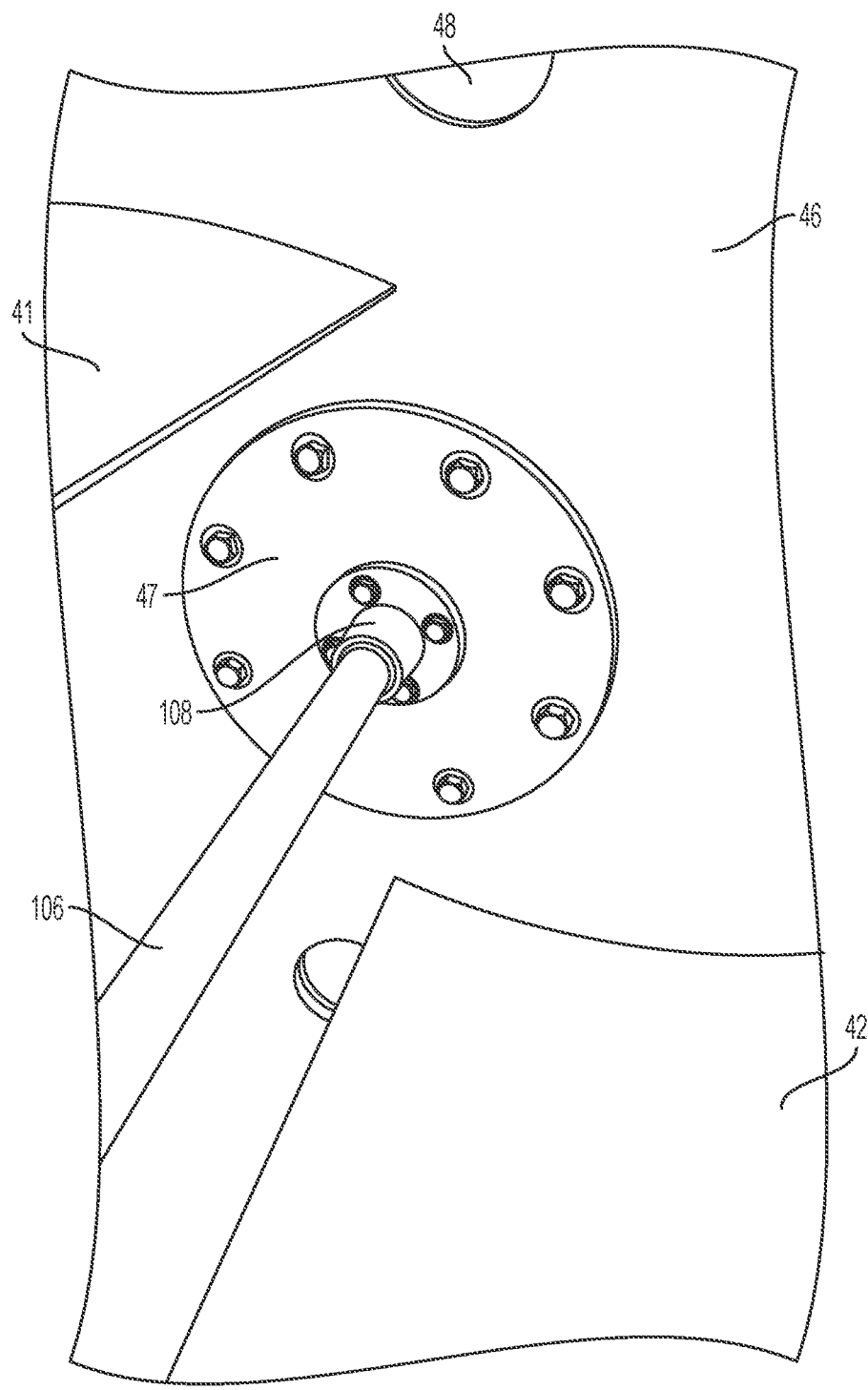
FIG. 11 is a perspective view of the torsion rod and an upper hub from the interior of the fourth rotor section of the Savonius wind turbine of FIG. 6.

With reference to FIG. 11, an upper hub 108 is fastened to the reinforcement plate 47 on the interior surface of the upper support disc 46 of the fourth rotor section 40 (or the reinforcement plate 27 on the interior surface of the upper support disc 26 of the second rotor section 20). The upper hub 108 engages the torsion rod 106 as the torsion rod 106 extends through the upper support disc 46 and the reinforcement plate 47 to stabilize the rotor assembly on the torsion rod 106. Although not specifically shown, it is to be appreciated that a hub of similar structure to the upper hub 108 may be provided throughout the structure of the rotor assembly to stabilize the torsion rod 106 as it passes through the support discs of the rotor assembly.

Figure 12:
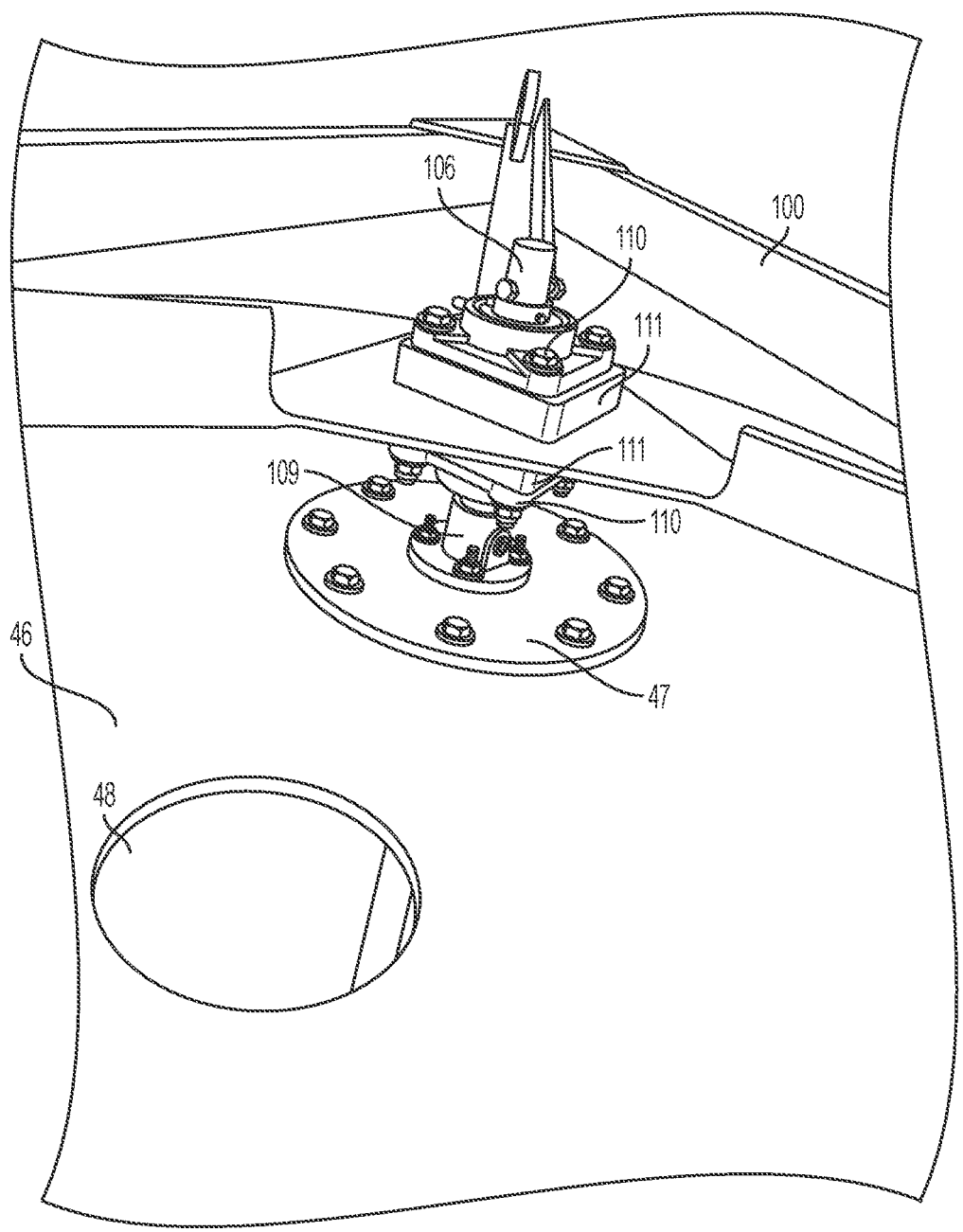
FIG. 12 is a perspective view of an uppermost portion of the Savonius wind turbine of FIG. 6.

With reference to FIG. 12, a top hub 109 is fastened to the reinforcement plate 47 on the exterior surface of the upper support disc 46 of the fourth rotor section 40 (or the reinforcement plate 27 on the exterior surface of the upper support disc 26 of the second rotor section 20). The top hub 109 engages the torsion rod 106 as the torsion rod 106 extends through the reinforcement plate 47 and the upper support disc 46. At the top, a portion of the frame 100 extends over the rotor assembly. As shown in FIG. 12, the torsion rod 106 extends through the top portion of the frame 100 above the rotor assembly. The torsion rod 106 is rotatably connected to the top portion of the frame 100 by a pair of pillow bearings 110 fastened to the upper and lower sides of the top portion of the frame 100. Respective spacers 111 are provided between the pillow bearings 110 and the top portion of the frame 100. The pillow bearings 110 are connected to the torsion rod 106 via a keyed connection to stabilize the torsion rod 106 while allowing the torsion rod 106 to rotate freely at the top of the rotor assembly. It is to be appreciated that a similar structure may be provided near the middle of the frame 100 above the second rotor section 20.

Figure 13:
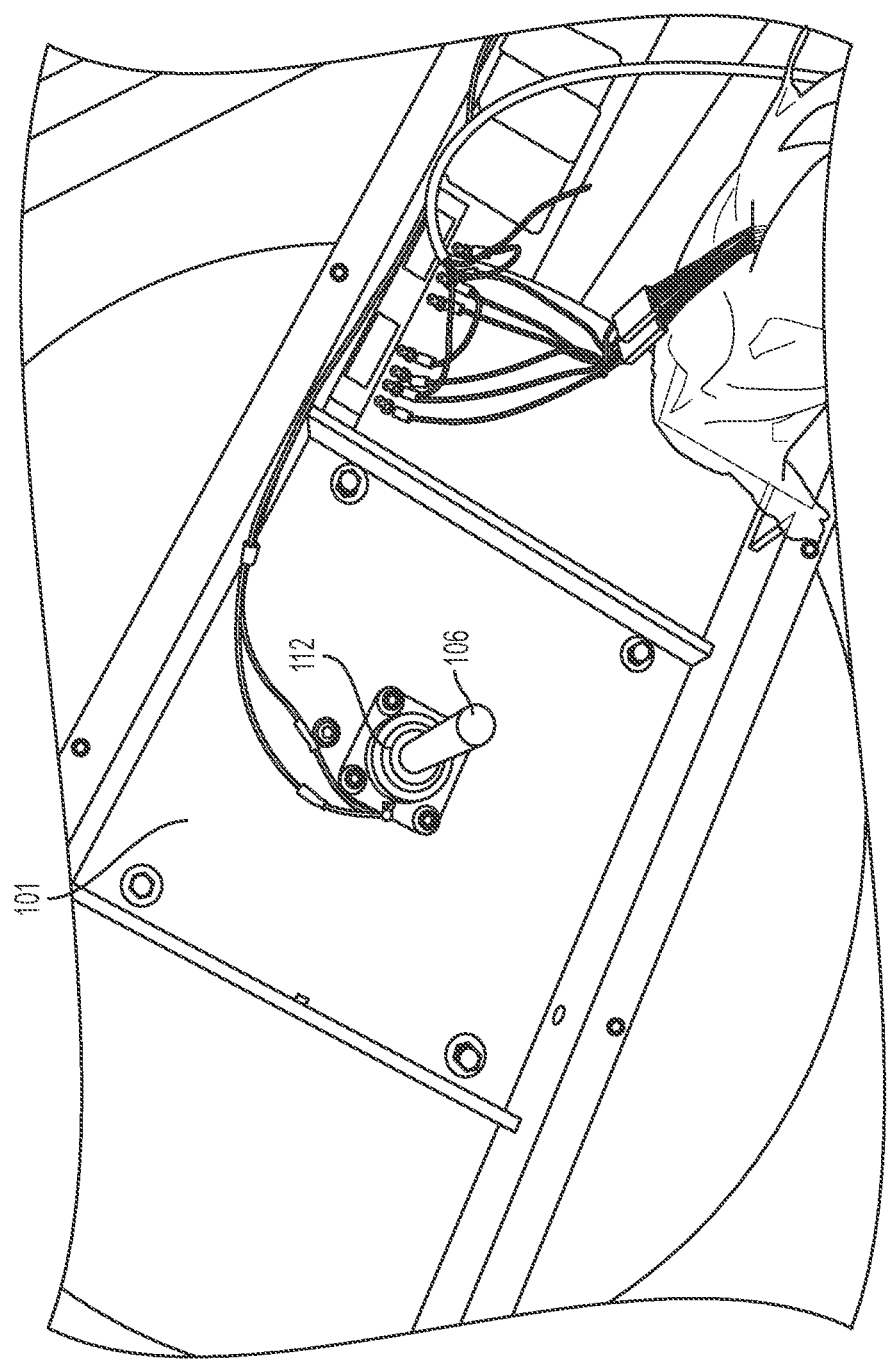
FIG. 13 is a perspective view of an interior of a transmission box at a bottom of the Savonius wind turbine of FIG. 6.

With reference to FIG. 13, another pillow bearing 112 is provided in the interior of the transmission box 101 beneath the rotor assembly. The pillow bearing 112 is fastened to an interior surface of the transmission box 101 at the location where the torsion rod 106 extends into the interior of the transmission box 101. The pillow bearing 112 is connected to the torsion rod 106 via a keyed connection to stabilize the torsion rod 106 while allowing the torsion rod 106 to rotate.

With reference to FIGS. 6-13, as discussed above, the rotor assembly of the Savonius wind turbine converts wind energy into kinetic energy around the longitudinal axis Y, along which extends the torsion rod 106. Torque is transferred from the rotor assembly to the torsion rod 106, which turns a generator located in the transmission box 101. Accordingly, the torsion rod 106 acts as the central drive shaft for the rotor assembly. To that end, the torsion rod 106 is connected to each of the first rotor section 10 and the second rotor section 20 (or to each of the third rotor section 30 and the fourth rotor section 40) via a keyed connection such that rotation of the first and second rotor sections 10, 20 drives rotation of the torsion rod 106. Multiple keyed connections between the torsion rod 106 and the first and second rotor sections 10, 20 may be established. According to one example of the present disclosure, keyed connections between the torsion rod 106 and the first and second rotor sections 10, 20 (or third and fourth rotor sections 30, 40) are made at the respective middle support discs 14, 25 of the first and second rotor sections 10, 20.

Wind is variable and creates constantly changing lateral and vertical stresses on the rotor assembly. Lateral stress on the rotor assembly, which tends to act about the longitudinal axis Y of the rotor assembly, is transferred to the torsion rod 106 through the connections between the torsion rod 106 and the rotor assembly. The torsion rod 106 is structured to absorb and transfer lateral stresses from the rotor assembly by twisting and then quickly returning to its original shape. In particular, the torsion rod 106 is made from a suitably elastic material having a torsion coefficient ($\kappa$) that is sufficiently large such that the lateral stresses on the rotor assembly generate stresses on the torsion rod 106 in the elastic range and do not cause permanent deformation or strain of the torsion rod 106. Accordingly, in addition to acting as a drive shaft transferring wind energy from the rotor assembly to the transmission, the torsion rod 106 acts as a torsion spring to absorb lateral stress on the rotor assembly in order to prevent or limit damage and/or failure of the rotor assembly due to the sudden or constant application of lateral stress on the rotor assembly caused by wind variations. Also, the transmission is configured to introduce an opposing torque on the torsion rod 106 to provide for electrical braking of the rotor assembly during high winds and/or abrupt changes in wind speed and direction. According to one example of the present disclosure, the torsion rod 106 is constructed with a torsion coefficient ($\kappa$) that is selected such that the torsion rod 106 undergoes elastic deformation in torsion for all operating speeds of the rotor assembly.

Vertical stresses on the rotor assembly are transferred to the frame 100 via the engagement between the bottom hub 105 beneath the rotor assembly and the support post 102 and bearing 103, as discussed above. As such, the primary vertical load of the rotor assembly is transferred to the frame 100 independent of the torsion rod 106. Accordingly, the torsion rod 106 can be provided with a minimal diameter, which minimizes interference with the wind flowing between the leaving and returning rotor blades of the rotor assembly. In turbine designs where the vertical load of the rotor assembly is carried by the central drive shaft, the drive shaft must be made larger, causing greater interference to airflow through the rotor blades.

Figure 14:
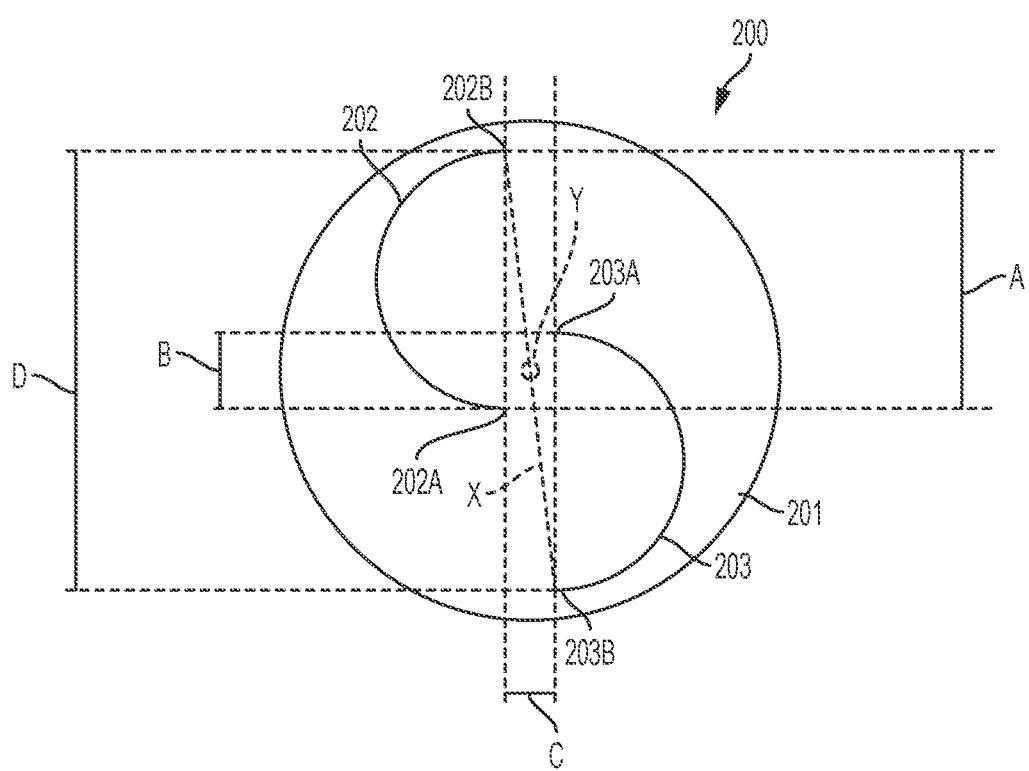
FIG. 14 is a schematic of a configuration of the blades of one of the rotor sections of FIG. 1 in accordance with an example of the present disclosure.

With reference to FIG. 14, a schematic view is provided illustrating the configuration of a set of curved turbine blades 202, 203 of a rotor section 200 according to an example of the present disclosure. The turbine blades 202, 203 are connected to support disc 201, as discussed above. Also as discussed above, the turbine blades 202, 203 extend parallel to a longitudinal axis Y of the rotor section 200 about which the rotor section 200 is driven to rotate by wind energy. As shown in FIG. 14, the first curved turbine blade 202 includes an inner edge 202A disposed near the longitudinal axis Y of the rotor section 200 and an outer edge 202B disposed near the edge of the support disc 201. Likewise, the second curved turbine blade 203 includes an inner edge 203A disposed near the longitudinal axis Y and an outer edge 203B disposed near the edge of the support disc 201. A length A of the blades 202, 203 is defined by the distance between the respective inner edge 202A, 203A and the respective outer edge 202B, 203B. As shown, the outer edges 202B, 203B lie on a circle defining a diameter D, which defines the combined diameter of the turbine blades 202, 203. As shown, this diameter D may be smaller than the diameter of the support disc 201. The turbine blades 202, 203 are arranged such that a line X connecting the outer edges 202B, 203B, known as a bisect, passes through the longitudinal axis Y.

As shown in FIG. 14, the curved turbine blades 202, 203 are arranged to overlap along their respective lengths A such that the respective inner edges 202A, 203A are separated by an overlap length B defined in a direction extending parallel to the respective lengths A of the blades 202, 203, i.e., in a direction extending generally along the bisect X. The inner edges 202A, 203A of the turbine blades 202, 203 are also spaced away from the bisect X without crossing the bisect X so as to be separated by a gap length C defined in a direction extending perpendicular to the respective lengths A of the blades 202, 203, i.e., in a direction extending across the bisect X.

Savonius wind turbines are generally constructed such that the inner edges of the blades lie along the bisect. In such a configuration, the inner edges of the blades in combination with a vertical rotation shaft of the rotor interfere with the movement of air through the rotor blades by creating a turbulent jet of air extending from the inner edge of the rotor blade on the downwind side of the rotor, which disrupts the flow of air across the surface of the blade thereby reducing the transmission of torque from wind energy to the rotor.

The rotor section 200 according to the example of FIG. 14, addresses the problem of turbulence by spacing the inner edges 202A, 203A of the blades 202, 203 away from the bisect X and toward the perimeter of the support disc 201 such that the gap length C is defined in the direction perpendicular to the length A of the blades 202, 203, i.e., in the direction extending across the bisect X. By moving the inner edges 202A, 203A of the turbine blades 202, 203 away from the bisect X, the amount of turbulence in the flow of air created at the inner edge of the downwind blade is reduced to provide for improved flow of air across the surface of the blade, which leads to greater transmission of torque from wind energy to the rotor section 200. As discussed above, reduction of the diameter of the torsion rod 106 will also serve to reduce turbulence in the air flow through the rotor assembly.

Additionally, the curved turbine blades 202, 203 according to the example of FIG. 14 are moved outwardly toward the perimeter of the support disc 201, which makes it possible to use larger and longer blades 202, 203 as supporting members for the rotor section 200, thereby allowing for a reduction in the size of the torsion rod/drive shaft 106. Reducing the size of the torsion rod/drive shaft 106 improves airflow between the blades. Moving the turbine blades 202, 203 outwardly also shifts the weight of the blades 202, 203 toward the outer edge of the support disc 201, away from the longitudinal axis Y. Doing so increases centrifugal force caused by rotation of the blades 202, 203, which essentially stores intertial energy in the rotor section 200 and assists in continuous rotation of the rotor section 200 in order to provide continous energy from a discontinuous source.

Further, according to one example of the disclosure, the curved turbine blades 202, 203 are sized and arranged to have certain ratios between the diameter D, the blade length A, the overlap length B, and the gap length C to maximize the transfer of torque from wind energy to the torsion rod 106 and the transmission. According to one example, the blade length A is approximately 0.5 D-0.8 D, more particularly approximately 0.6 D, the overlap length B is approximately 0.2 D-0.5 D, more particularly 0.3 D, or 0.3 A-0.7 A, more particularly 0.5 A, and the gap length C is approximately 0.1 D-0.3 D, more particularly 0.1 D, or 0.2 A-0.3 A, more particularly 0.2 A. It is to be appreciated that the ratios provided above are merely exemplary and may be adjusted to any value found to be suitable by those having ordinary skill in the art.

Further examples of the present disclosure will now be described in the following number clauses.

Clause 1: A rotor assembly for a wind turbine, the rotor assembly being configured to rotate about a longitudinal axis (Y), the rotor assembly comprising: at least one rotor section (10), the at least one rotor section comprising: at least two curved turbine blades (11, 12) extending parallel to the longitudinal axis (Y); and at least two support discs (13, 15) connected to the at least two curved turbine blades, wherein at least one of the at least two support discs (13, 15) has at least one relief vent (17) defined therein for allowing air to pass through the at least one support disc (13, 15).

Clause 2: The rotor assembly according to clause 1, wherein the at least two support discs of the at least one rotor section (10) comprise a lower support disc (13), a middle support disc (14), and an upper support disc (15), and wherein at least the middle support disc (14) and the upper support disc (15) each comprise a plurality of relief vents (17).

Clause 3: The rotor assembly according to clause 1 or clause 2, wherein the at least one rotor section comprises a first rotor section (10) and a second rotor section (20) disposed above the first rotor section (10), the at least two curved turbine blades (21, 22) of the second rotor section (20) being angularly offset with respect to the at least two curved turbine blades (11, 12) of the first rotor section (10).

Clause 4: The rotor assembly according to clause 3, wherein the at least two support discs of the first rotor section (10) comprise a lower support disc (13), a middle support disc (14), and an upper support disc (15), wherein each of the middle support disc (14) and the upper support disc (15) of the first rotor section (10) comprises a plurality of relief vents (17), wherein the at least two support discs of the second rotor section (20) comprise a lower support disc (23), a middle support disc (25), and an upper support disc (26), and wherein each of the lower support disc (23), the middle support disc (25), and the upper support disc (26) of the second rotor section (20) comprises a plurality of relief vents (28).

Clause 5: The rotor assembly according to clause 4, wherein the plurality of relief vents (28) in the lower support disc (23) of the second rotor section (20) align with the plurality of relief vents (17) in the upper support disc (15) of the first rotor section (10).

Clause 6: The rotor assembly according to clause 4 or clause 5, wherein the first rotor section (10) further comprises a reinforcement plate (16) on the upper support disc (15) and the second rotor section (20) further comprises a reinforcement plate (24) on the lower support disc (23), and wherein the first rotor section (10) and the second rotor section (20) are connected via the reinforcement plates (16, 24).

Clause 7: A wind turbine, comprising: two rotor assemblies configured to rotate about a longitudinal axis (Y), each rotor assembly comprising at least one rotor section (10, 30) that comprises at least two curved turbine blades (11, 12, 31, 32) extending parallel to the longitudinal axis (Y), wherein the curved turbine blades (11, 12, 31, 32) of the two rotor assemblies are oriented with respect to the longitudinal axis (Y) so that the two rotor assemblies are driven to rotate about the longitudinal axis (Y) in opposing rotational directions by wind.

Clause 8: The wind turbine according to clause 7, wherein each rotor section (10, 30) further comprises at least two support discs (13, 15, 33, 35) connected to the respective at least two curved turbine blades (11, 12, 31, 32), and wherein in each rotor section (10, 30) at least one of the at least two support discs (13, 15, 33, 35) has at least one relief vent (17, 37) defined therein for allowing air to pass through the at least one support disc (13, 15, 33, 35).

Clause 9: The wind turbine according to clause 8, wherein each of the two rotor assemblies comprises two rotor sections (10, 20, 30, 40), and wherein the two rotor sections (10, 20, 30, 40) of each rotor assembly are fastened so as to rotate together about the longitudinal axis (Y).

Clause 10: The wind turbine according to any one of clauses 7-9, further comprising a torsion rod (106) extending through at least one of the two rotor assemblies along the longitudinal axis (Y), the torsion rod (106) being connected to the at least one of the two rotor assemblies so that rotation of the rotor assembly causes rotation of the torsion rod (106), wherein the torsion rod (106) is configured to transfer rotation of the rotor assembly to a transmission, and wherein the torsion rod (106) is configured to twist to absorb lateral stresses on the rotor assembly.

Clause 11: The wind turbine according to any one of clauses 7-10, further comprising a frame structure (100) configured to support the two rotor assemblies, wherein at least one of the two rotor assemblies is rotatably mounted on a support post (102) and a bearing (103) on the frame structure (100).

Clause 12: The wind turbine according to clause 11, wherein the at least one of the two rotor assemblies further comprises a bottom hub (105) configured to engage the bearing (103) and support post (102), the bottom hub (105) comprising a recess configured to receive the bearing (103).

Clause 13: A wind turbine, comprising: a frame structure (100); at least one rotor assembly provided on the frame structure (100) and configured to rotate about a longitudinal axis (Y), the at least one rotor assembly comprising at least one rotor section (10) that comprises at least two curved turbine blades (11, 12) extending parallel to the longitudinal axis (Y); and a torsion rod (106) extending through the at least one rotor assembly along the longitudinal axis (Y), the torsion rod (106) being connected to the at least one rotor assembly so that rotation of the at least one rotor assembly causes rotation of the torsion rod (106), wherein the torsion rod (106) is configured to be connected to a transmission disposed on the frame structure (100), wherein the torsion rod (106) is also configured to twist to absorb lateral stresses on the at least one rotor assembly, and wherein the at least one rotor assembly is mounted on a support post (102) and a bearing (103) on the frame structure (100) independent of the torsion rod (106).

Clause 14: The wind turbine according to clause 13, wherein the at least one rotor section of the at least one rotor assembly comprises a first rotor section (10) and a second rotor section (20), wherein each of the first and second rotor sections (10, 20) further comprises a lower support disc (13, 23), a middle support disc (14, 25), and an upper support disc (15, 26) connected to the respective at least two curved turbine blades (11, 12, 21, 22), and wherein in each rotor section (10, 20) at least one of the support discs (13, 14, 15, 23, 25, 26) has at least one relief vent (17, 28) defined therein for allowing air to pass through the at least one support disc (13, 14, 15, 23, 25, 26).

Clause 15: The wind turbine according to clause 14, wherein the first rotor section (10) further comprises a reinforcement plate (16) on the upper support disc (15) and the second rotor section (20) further comprises a reinforcement plate (24) on the lower support disc (23), and wherein the first rotor section (10) and the second rotor section (20) are connected via the reinforcement plates (16, 24).

Clause 16: The wind turbine according to any one of clauses 13-15, wherein the at least one rotor assembly comprises two rotor assemblies, and wherein the curved turbine blades (11, 12, 31, 32) of the two rotor assemblies are oriented with respect to the longitudinal axis (Y) so that the two rotor assemblies are driven to rotate about the longitudinal axis (Y) in opposing rotational directions by wind.

Clause 17: The wind turbine according to clause 16, wherein the at least one rotor section of each of the two rotor assemblies comprises two rotor sections (10, 20, 30, 40), wherein each rotor section (10, 20, 30, 40) comprises a lower support disc (13, 23, 33, 43), a middle support disc (14, 25, 34, 45), and an upper support disc (15, 26, 35, 46), and wherein in each of the two rotor assemblies the curved turbine blades (11, 12, 21, 22, 31, 32, 41, 42) of the two rotor sections (10, 20, 30, 40) are angularly offset with respect to each other.

Clause 18: The wind turbine according to any one of clauses 13-17, wherein the at least one rotor assembly further comprises a bottom hub (105) configured to engage the bearing (103) and support post (102), the bottom hub (105) comprising a recess configured to receive the bearing (103).

Clause 19: The wind turbine according to clause 18, further comprising a transmission box (101) supported on the frame structure (100), the transmission box (101) being configured to house the transmission, wherein the torsion rod (106) extends from the at least one rotor assembly through the bottom hub (105), the bearing (103), the support post (102), and into the transmission box (101).

Clause 20: The wind turbine according to any one of clauses 13-19, wherein an upper end of the torsion rod (106) is connected to the frame structure (100) by at least one pillow bearing (110).

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A wind turbine, the wind turbine comprising:
a rotor assembly configured to rotate about a longitudinal axis, the rotor assembly comprising:
at least one rotor section, the at least one rotor section comprising:
at least two curved turbine blades extending parallel to the longitudinal axis; and
at least two support discs connected to the at least two curved turbine blades,
wherein at least one of the at least two support discs has at least one relief vent defined therein for allowing air to pass through the at least one support disc;
a frame structure, the rotor assembly being provided on the frame structure, the frame structure having a support post and bearing disposed thereon; and
a torsion rod extending through the rotor assembly along the longitudinal axis, the torsion rod being connected to the rotor assembly so that rotation of the rotor assembly causes rotation of the torsion rod,
wherein the torsion rod is configured to be connected to a transmission disposed on the frame structure,
wherein the torsion rod is configured to elastically deform in torsion and is connected to the rotor assembly so as to twist within the rotor assembly to absorb lateral stresses on the rotor assembly, and
wherein the rotor assembly is mounted on the support post and the bearing on the frame structure independent of the torsion rod, the support post and bearing being configured to support an axial load of the rotor assembly, the torsion rod extending through the support post and bearing toward the transmission.

2. The wind turbine according to claim 1, wherein the at least two support discs of the at least one rotor section comprise a lower support disc, a middle support disc, and an upper support disc, and
wherein at least the middle support disc and the upper support disc each comprise a plurality of relief vents.

3. The wind turbine according to claim 1, wherein the at least one rotor section comprises a first rotor section and a second rotor section disposed above the first rotor section, the at least two curved turbine blades of the second rotor section being angularly offset with respect to the at least two curved turbine blades of the first rotor section.

4. The wind turbine according to claim 3, wherein the at least two support discs of the first rotor section comprise a lower support disc, a middle support disc, and an upper support disc,
wherein each of the middle support disc and the upper support disc of the first rotor section comprises a plurality of relief vents,
wherein the at least two support discs of the second rotor section comprise a lower support disc, a middle support disc, and an upper support disc, and
wherein each of the lower support disc, the middle support disc, and the upper support disc of the second rotor section comprises a plurality of relief vents.

5. The wind turbine according to claim 4, wherein the plurality of relief vents in the lower support disc of the second rotor section align with the plurality of relief vents in the upper support disc of the first rotor section.

6. The wind turbine according to claim 4, wherein the first rotor section further comprises a reinforcement plate on the upper support disc and the second rotor section further comprises a reinforcement plate on the lower support disc, and wherein the first rotor section and the second rotor section are connected via the reinforcement plates.

7. The wind turbine according to claim 1, wherein the rotor assembly is a first rotor assembly and the wind turbine further comprises a second rotor assembly configured to rotate about the longitudinal axis,
wherein the second rotor assembly comprises:
at least one rotor section, the at least one rotor section comprising:
at least two curved turbine blades extending parallel to the longitudinal axis; and
at least two support discs connected to the at least two curved turbine blades, and
wherein the curved turbine blades of the first rotor assembly and the second rotor assembly are oriented with respect to the longitudinal axis so that the first rotor assembly and the second rotor assembly are driven to rotate about the longitudinal axis in opposing rotational directions by wind.

8. The wind turbine according to claim 7, wherein each of the first rotor assembly and the second rotor assembly comprises two rotor sections, and wherein the two rotor sections of each rotor assembly are fastened so as to rotate together about the longitudinal axis.

9. The wind turbine according to claim 1, wherein the rotor assembly further comprises a bottom hub configured to engage the bearing and support post, the bottom hub comprising a recess configured to receive the bearing.

10. The wind turbine according to claim 9, further comprising a transmission box supported on the frame structure, the transmission box being configured to house the transmission, wherein the torsion rod extends from the rotor assembly through the bottom hub, the bearing, the support post, and into the transmission box.

11. The wind turbine according to claim 1, wherein an upper end of the torsion rod is connected to the frame structure by at least one pillow bearing.

12. The wind turbine according to claim 1, wherein the torsion rod is configured to absorb lateral stresses on the rotor assembly independently from the support post and bearing.

\* \* \* \* \*